US 8,627,500 B2

(12) United States Patent
Rogel et al.

(10) Patent No.: US 8,627,500 B2
(45) Date of Patent: Jan. 7, 2014

(54) METHODS AND APPARATUS FOR SHARING, TRANSFERRING AND REMOVING PREVIOUSLY OWNED DIGITAL MEDIA

(75) Inventors: Lawrence S. Rogel, Brookline, MA (US); John M. Ossenmacher, Balboa Island, CA (US); Micha Moffie, Somerville, MA (US); Amihai Viks, Ramat Gan (IL)

(73) Assignee: ReDigi, Inc., Boston, MA (US)

( * ) Notice: Subject to any disclaimer, the term of this patent is extended or adjusted under 35 U.S.C. 154(b) by 114 days.

(21) Appl. No.: 12/983,257

(22) Filed: Dec. 31, 2010

(65) Prior Publication Data

US 2011/0162086 A1    Jun. 30, 2011

Related U.S. Application Data

(60) Provisional application No. 61/291,498, filed on Dec. 31, 2009.

(51) Int. Cl.
 *G06F 7/04* (2006.01)
 *G06Q 30/00* (2012.01)

(52) U.S. Cl.
 USPC .......................................... 726/28; 705/26.1

(58) Field of Classification Search
 CPC ..................................................... G06F 21/10
 USPC .......................................... 726/28; 705/26.1
 See application file for complete search history.

(56) References Cited

U.S. PATENT DOCUMENTS

| | | | |
|---|---|---|---|
| 5,918,223 A | 6/1999 | Blum et al. | |
| 6,078,929 A | 6/2000 | Rao | |
| 7,076,652 B2 | 7/2006 | Ginter et al. | |
| 7,110,984 B1 | 9/2006 | Spagna et al. | |
| 7,277,766 B1 | 10/2007 | Khan et al. | |
| 7,496,540 B2 | 2/2009 | Irwin et al. | |
| 7,809,644 B2 * | 10/2010 | Stefik et al. | 705/51 |
| 8,161,103 B2 * | 4/2012 | Lee | 709/203 |
| 2002/0052849 A1 * | 5/2002 | McCutchen et al. | 705/59 |
| 2002/0095429 A1 | 7/2002 | Song et al. | |
| 2003/0004885 A1 * | 1/2003 | Banerjee et al. | 705/52 |
| 2004/0111619 A1 * | 6/2004 | Laurie et al. | 713/179 |
| 2005/0004875 A1 * | 1/2005 | Kontio et al. | 705/52 |
| 2006/0021056 A1 * | 1/2006 | Koppen | 726/26 |
| 2007/0073592 A1 | 3/2007 | Perry et al. | |
| 2007/0089174 A1 | 4/2007 | Bader et al. | |
| 2007/0104329 A1 * | 5/2007 | England et al. | 380/255 |

(Continued)

OTHER PUBLICATIONS

International Search Report and Written Opinion mailed Nov. 15, 2011 for Application No. PCT/US2011/44964 (13 Pages).

(Continued)

*Primary Examiner* — Techane Gergiso
(74) *Attorney, Agent, or Firm* — Nutter McClennen & Fish LLP; David J. Powsner

(57) ABSTRACT

The invention provide systems and methods for management of digital media objects, comprising first and second client digital data processors (e.g., personal (or private) computers, laptops, dedicated music devices, electronic book readers, and so forth) that are in communications coupling with one or more stores (e.g, dedicated disk drives, flash drives, cloud storage, etc.). At least one digital media object (DMO) or copy thereof is stored in one or more of those stores and is accessible by at least one of the first and second client digital data processors.

24 Claims, 4 Drawing Sheets

(56) References Cited

U.S. PATENT DOCUMENTS

| | | | |
|---|---|---|---|
| 2007/0124583 A1* | 5/2007 | Andersson et al. | 713/165 |
| 2007/0130585 A1* | 6/2007 | Perret et al. | 725/46 |
| 2007/0198419 A1 | 8/2007 | Park et al. | |
| 2007/0210155 A1 | 9/2007 | Swartz et al. | |
| 2007/0219917 A1* | 9/2007 | Liu et al. | 705/59 |
| 2007/0276767 A1 | 11/2007 | Kim et al. | |
| 2008/0033802 A1 | 2/2008 | McKenna et al. | |
| 2008/0065911 A1 | 3/2008 | Elazar et al. | |
| 2008/0072335 A1 | 3/2008 | David et al. | |
| 2008/0086422 A1 | 4/2008 | Wolff et al. | |
| 2008/0120242 A1 | 5/2008 | Krig et al. | |
| 2008/0127177 A1* | 5/2008 | Oh et al. | 717/174 |
| 2008/0133940 A1* | 6/2008 | Laurie et al. | 713/193 |
| 2008/0154626 A1 | 6/2008 | Gounares et al. | |
| 2008/0163377 A1* | 7/2008 | Lee et al. | 726/26 |
| 2008/0208663 A1 | 8/2008 | Walker et al. | |
| 2008/0215633 A1 | 9/2008 | Dunkeld et al. | |
| 2008/0263681 A1 | 10/2008 | Dooms et al. | |
| 2008/0270307 A1* | 10/2008 | Olson et al. | 705/51 |
| 2008/0294453 A1 | 11/2008 | Baird-Smith et al. | |
| 2008/0294531 A1* | 11/2008 | Nassimi | 705/26 |
| 2009/0083764 A1* | 3/2009 | Davis et al. | 719/321 |
| 2009/0106847 A1 | 4/2009 | Krupman et al. | |
| 2009/0164794 A1 | 6/2009 | Verosub et al. | |
| 2009/0240745 A1 | 9/2009 | Stahl et al. | |
| 2009/0307062 A1 | 12/2009 | Lutnick et al. | |
| 2009/0327094 A1* | 12/2009 | Elien et al. | 705/26 |
| 2010/0063873 A1 | 3/2010 | McGucken | |
| 2010/0067705 A1* | 3/2010 | Boccon-Gibod et al. | 380/285 |
| 2010/0333211 A1 | 12/2010 | Schonfeld et al. | |
| 2011/0047041 A1 | 2/2011 | Kemery | |
| 2011/0202415 A1 | 8/2011 | Casares et al. | |
| 2012/0022932 A1 | 1/2012 | Ossenmacher et al. | |
| 2013/0031643 A1 | 1/2013 | Rogel et al. | |
| 2013/0204979 A1 | 8/2013 | Rogel et al. | |

OTHER PUBLICATIONS

International Search Report and Written Opinion mailed Jan. 19, 2012 for Application No. PCT/US2010/62658 (10 Pages).

Board Meeting Monday, dated Nov. 3, 2011.

Sweazey, Paul et al., "Digital Emulation of Consumer-Ownable Products", Consumer Electronics (ICCE), 2011 IEEE International Conference, dated Jan. 9-12, 2011.

Status Page; standards.ieee.org/development/wg/DPP.html, dated Nov. 11, 2011.

IEEE P1817 Standard for Consumer-ownable Digital Personal Property, http://grouper.ieee.org/groups/1817/HowItWorks.html, dated Nov. 11, 2011.

New IEEE Standards Initiative Aims at Digital Personal Property Copyright and Technology, Jul. 2, 2010, 10 pages.

U.S. Appl. No. 12/841,779, filed Jul. 22, 2010.

Amazon.com—Microsoft SideWinder X6 Keyboard as of Jan. 1, 2008 (obtained from the Internet Archive Wayback Machine http://web.archive.org).

International Search Report for Application No. PCT/US2013/024931, issued Apr. 15, 2013. (12 pages).

International Preliminary Report on Patentability for Application No. PCT/US2010/062658, mailed Jul. 12, 2012 (8 pages).

International Search Report and Written Opinion mailed Aug. 3, 2012 for Application No. PCT/US2012/26776 (23 Pages).

International Preliminary Report on Patentability for Application No. PCT/US2011/044964, mailed Jan. 31, 2013 (10 pages).

* cited by examiner

METHODS AND APPARATUS FOR SHARING, TRANSFERRING AND REMOVING PREVIOUSLY OWNED DIGITAL MEDIA

This claims the benefit of filing of U.S. Patent Application Ser. No. 61/291,498, entitled Methods and Apparatus for Sharing, Transferring and Removing Previously Owned Digital Media," filed Dec. 31, 2010, the teachings of which are incorporated herein by reference.

BACKGROUND OF THE INVENTION

The invention pertains to digital media and, more particularly, by way of non-limiting example, to the management of music, e-books and other forms of digital media. The invention has application, by way of non-limiting example, in identifying, sharing, transferring, redistributing and removing previously owned digital media.

Digital computer music is very popular but so is the practice of making and distributing copyright-infringing copies. The music industry has tried many ways to prevent unauthorized copying and distributing digital music. The problem is not limited to digital music, however, digital movies, e-books, and many other digital media objects are also subject to such copying.

Some methods of playing digital music and videos, such as DVD players and Microsoft's Windows Media Player, will only play objects that can be verified as original and legal. Other devices go even further and remove content deemed illegal. For example, the producers of special purpose devices for playing music, running software games, and displaying e-books have retained the right to remove content even after it is purchased and installed on a user's device. For example, digital media objects purchased through Apple's "app" store can be remotely removed from an iPhone or iTouch without the owner's knowledge. Similarly for Amazon's Kindle e-book reader. This can be done in a vertical market in which the producer of the device is also the sole content distributor.

In a non-vertical market, when there is a personal computer in the chain of producer to consumer, it is often challenging to determine if a file contains a particular digital media object. Small changes to the file undetectable by the viewer or listener make it hard to determine the exact contents of a file.

Other technology, however, can identify the contents of a digital media object. For example, in the case of digital music, there are several ways to perform acoustic fingerprinting or content-based audio identification, e.g. see U.S. Pat. No. 7,277,766 and U.S. Pat. No. 5,918,223. These and other methods identify content from excerpts of only a few seconds long and deal with shifting (not knowing exactly where in the content is the excerpt). Some can also handle other sources of degradation such as pitching (playing it faster or slower), equalization, and background noise. They are relatively computationally efficient.

There are two fundamental processes for identifying the content of a digital media object (not just audio): fingerprint extraction and matching algorithm. The first processes the contents of a digital media object producing a set of features that are particular to the specific object. The second uses these to identify the object by querying a database of known objects and their features.

Note that the second process is not need when the digital media object is known. For example, consider the case when one wants to find all files that the Beatle's song "Yesterday." Given a fingerprint of "Yesterday" one just compares this with the fingerprints of all files.

Fingerprinting should not be confused with digital watermarking which relies on inserting identifying features into the content itself, and therefore changing the nature of the content. Watermarks must be inserted at the source in order to identify content and may be changed or removed at a later time by anyone.

Like audio, video fingerprinting is also a well-known technology. For audio and video, there are many fingerprinting services, such as:

| | |
|---|---|
| Advestigo | (audio, video and image fingerprinting) |
| Attributor | (image and video fingerprinting) |
| Auditude Connect technology | (audio and video fingerprinting) |
| Audible Magic | (audio video image fingerprinting) |
| AudioFingerprint | at MusicBrainz's wiki |
| INA | (video fingerprinting) |
| iPharro Media | (video fingerprinting) |
| Philips Content Identification | (audio and video fingerprinting) |
| MetatOGGer | freeware using the MusicDNS service for identifying audio files |
| New Media Lab | broadcast monitoring service using audio fingerprinting technology. |
| Civolution | (audio and video fingerprinting) |
| Thomson | (video fingerprinting) |
| Vercury | (audio, image and video fingerprinting) |
| Vidyatel Video conform, TV tracking and Management | (frame accurate video fingerprinting) |
| Vobile Content Identification and Management | (audio and video fingerprinting) |
| YUVsoft | (video fingerprinting and search) |
| Zeitera | (video fingerprinting) |

Electronic books can be read on a computer, laptop, smart phone, PDA, or specialized e-book reader. Many e-book readers use e-ink as a display device because they require less power, and are easy to read in bright sun light, and are less expensive. E-ink currently cannot render animations with sufficient speed to look seamless. Consequently, e-book readers tend to be of limited computational value, and are usually dedicated to the single function of displaying the pages of an electronic book. The Illiad IRex, Amazon Kindle, Sony Reader, and the Barns-n-Noble Nook are some dedicated e-book readers.

To date, the publishers have a tighter control on the distribution of e-books. There are some digitizing and scanning services, such as the Gutenberg Project and Google's book scanning effort, that place digital versions of many books in the public domain. It is much easier to fingerprint books, since the words have a much more standard format.

Depending on the type of ebook software, the ebook file is either encrypted to a specific computer or device (meaning it can only be read on that computer or device) or it is encrypted to a specific user's account (meaning it can be read on any device or computer which contains that user's secret account information).

If an ebook has been protected for only one person to read, then consumers (or "users") download the file to their computer and must read the ebook on that computer (or on other devices containing their secret account information). Copies of the ebook can only be read on authorized computers or by authorized users.

If a publisher/author has decided not to copy-protect their ebook, then consumers (or "users") download the file to their computer and can then copy it to any other computer/device they choose. The ebook may be read on any supported computer and by any user.

Other digital media objects work in a similar fashion.

In view of the foregoing, an object of the invention is to provide improved systems and methods for digital data processing and, more particularly, for the management of music, e-books and other forms of digital media.

SUMMARY OF THE INVENTION

The foregoing are among the objects attained by the invention which provides, in some aspects, systems and methods for managing digital media objects (e.g., digital music files) so that actions taken with respect to them verifiably mimics at least some of the consequences those actions would have on the physical counterparts of those objects, e.g., record albums or CDs.

Thus, for example, in related aspects, the invention provides such systems and methods that support "ownership" (or acquisition) of digital objects such that, for example, when a user buys such an object, the user acquires an actual (or virtual) copy of it, along with the right to use it—subject, for example, to the copyright or other applicable laws or agreements. In further related aspects, the invention provides such systems and methods that support transfers of ownership such that, for example, when a user sells such an object, all copies of it are removed from the user's computer and other synchronized devices (e.g., MP3 players).

Further aspects of the invention provide such systems and methods that compensate for and/or take advantage of the digital nature of the object. According to these aspects of the invention, for example, if the owner's computer breaks, the digital object becomes corrupted, or the owner buys a new computer, the owner can still get the object.

In another aspect, the invention provides systems and methods, e.g., as described above, for transferring previously purchased digital media from the current legal owner to a new owner in compliance with the first sale doctrine, the Digital Millennium Copyright Act and so forth.

In another aspect, the invention provides systems and methods, e.g., as described above, for identifying, fingerprinting, compressing, deleting and transferring digital objects between parties.

In another aspect, the invention provides systems and methods, e.g., as described above, that support the right to transfer and facilitate the transfer of previously purchased digital media to another and provides permission for any parts of the file that contain personal or purchase data to be modified or removed.

In another aspect, the invention provides systems and methods, e.g., as described above, for removing all identified files from all devices that are or become connected to the application source device.

In another aspect, the invention provides systems and methods, e.g., as described above, for removing and or modifying the Personal ID (PID) associated with a specific file or files and adding a new PID to the file from which the previous PID has been removed and or modified.

In another aspect, the invention provides methods, e.g., as described above, for sharing digital data in a similar way to physical hard goods, e.g., within a software application, such that the owner can loan their media, for a predetermined period of time, to another person or entity whereby the lender will not have full access to the media within their application and the lendee will have full use with the exception of the ability to copy an exact duplicate of the media loaned.

In another aspect, the invention provides systems and methods for inventory control that algorithmically determine the likely inventory required on a period basis and allows users to transfer desired media to application and receive credit for said transfer if inventory is required by the algorithm, if inventory is not currently required users inventory will be pegged and transferred as needed in order of priority, the application will keep record of available to transfer media stored on user applications.

In another aspect, the invention provides systems and methods for annotation template that allows the digital media to be annotated with notes, pictures, graphs, ideas, any annotation that is separate from the digital media but overlays in the proper place when used in conjunction with the media source or can be used standalone as a summary of annotations for a specific media file. For example, the invention can include a copyright generator that continually updates and assigns copyright of all template annotations.

In another aspect, the invention provides systems and methods for media revenue allocation that algorithmically allocate a portion of applicable sales to the appropriate parties.

Further aspects of the invention are evident in Appendix A, in which exemplary systems and methods according to the invention are referred to as ReDigi™.

Further aspects of the invention provide a system for management of digital media objects, comprising first and second client digital data processors (e.g., personal (or private) computers, laptops, dedicated music devices, electronic book readers, and so forth) that are in communications coupling with one or more stores (e.g, dedicated disk drives, flash drives, cloud storage, etc.). At least one digital media object (DMO) or copy thereof is stored in one or more of those stores and is accessible by at least one of the first and second client digital data processors.

During a first period of time, the first client digital data processor is substantially free of discouragement from accessing the DMO or copy thereof by management logic (e.g., management software) that executes on that first client or is in communications coupling therewith.

During a second (e.g., later) period of time that is mutually exclusive of the first period, the management logic selectively discourages the first client digital data processor from accessing the DMO or any copies thereof. Such discouragement can be, by way of example, the sending of warning messages, the blocking of access to one or more accounts or services, the blocking of file system access to such DMO or copies, and so forth. During that same second period, the second client digital data processor is substantially free of discouragement from accessing the DMO or its copies copy thereof by said management logic.

According to aspects of the invention, the first period corresponds to a time when the first client digital data processor (e.g., or operator thereof) "owns" the DMO. The second period corresponds to a time after which the first client (or operator) has relinquished ownership. In related aspects of the invention, that second period also corresponds to a time when the second client digital data processor (or operator) has assumed ownership of the DMO.

Further aspects of the invention provide systems, e.g., as described above, in which the DMO is any of a digital song, a video, a movie, an electronic book, a digital story, a digital article, a digital document, a digital still image, a digital game, or a portion thereof. In related aspects of the invention, the DMO is a file representing any of the foregoing.

Still further related aspects of the invention provide systems, e.g., as described above, wherein the management logic computes and/or assigns a common, unique fingerprint to the DMO and any copies thereof. In related aspects of the invention, that logic discourages the first client from accessing any file or other DMO having that common, unique fingerprint.

Still other aspects of the invention provide systems, e.g., as described above, in which the management logic effects such selective discouragement in response to a transfer-ownership event, e.g., a request by the first client to sell the DMO and/or by the second client to buy the DMO. In related aspects of the invention, the management logic can respond to a request by the first client to sell the DMO by confirming that digital data processor indeed owns it.

Yet still other aspects of the invention provide systems, e.g., as described above, wherein the management logic effects the selective discouragement in response to a transfer-ownership event. In related aspects, that event is signaled or otherwise effected by a server digital data processor that is in communications coupling with the first and second client digital data processors. In still further related aspects, the server thus effects an atomic transfer of ownership of the DMO from the first client to the second client.

As used herein, the terms "client digital data processor," "client," and the like refer to a respective one of the client digital data processors, e.g., under the control of and/or at the behest of its human owner and/or operator. As will be evident in the discuss that follows, these terms may refer to the action of human owner (or operator) him or herself.

Further aspects of the invention provides systems, e.g., as described above, wherein a collection of multiple digital data processors (e.g., personal computers, laptops, dedicated music devices, etc., owned by the same person or family) stand in the stead of one of the client digital data processors described above.

Still further aspects of the invention provide methods of method for management of digital media objects paralleling the operations described above.

These and other aspects of the invention are evident in the drawings and in the text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Introduction

Figure 1:
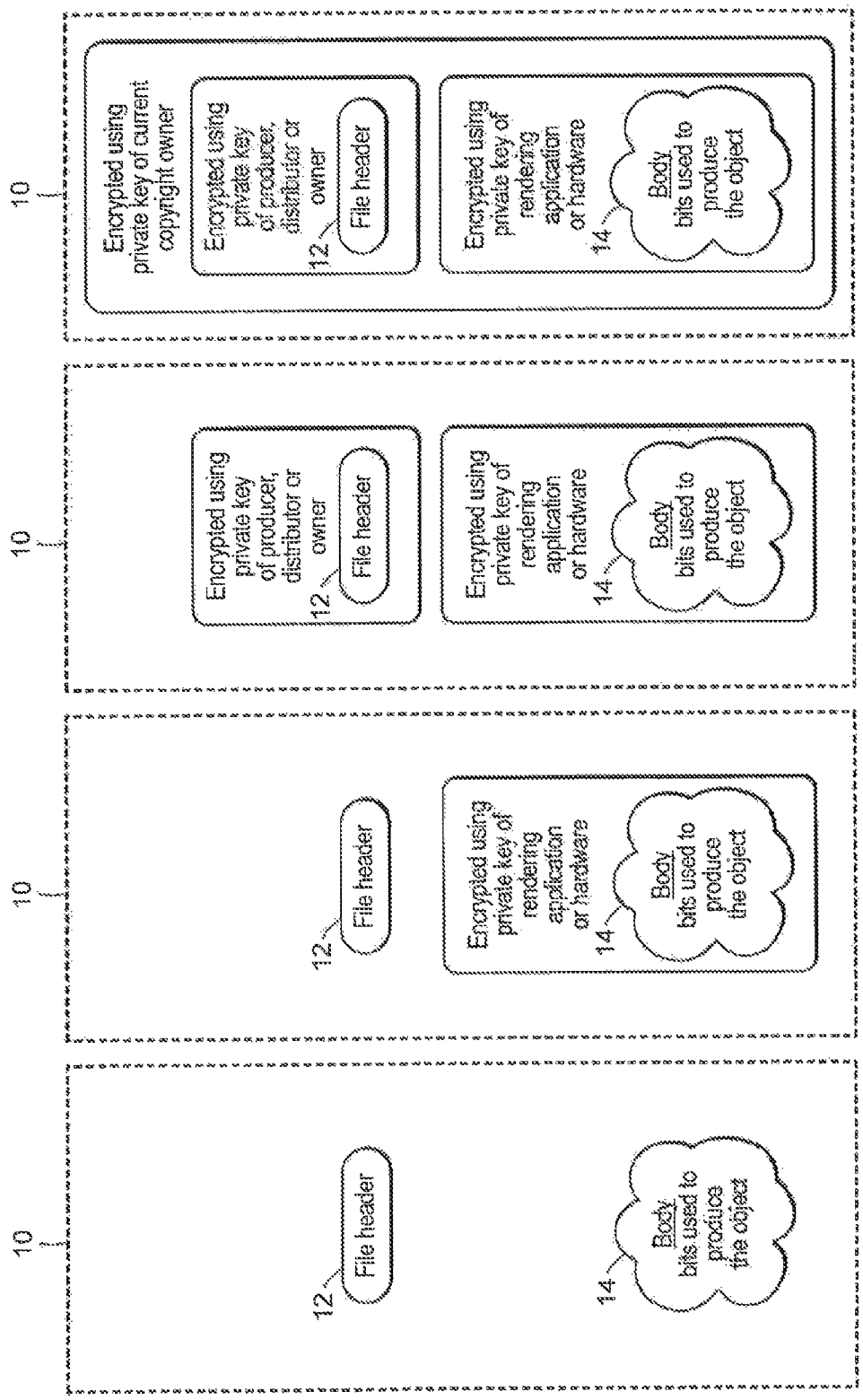
FIG. 1 depicts options to encrypt different parts of the file containing a digital media object in a system according to the invention.

Digital media objects, such as digital songs, movies, electronic books, mimic many features and aspects of their corresponding physical objects, although, to date there are significant ways in which they still differ. In particular, there is no common way to resell a digital media object. To do so, a system is needed that can verify that someone owns a object before selling it, and that after selling it, they no longer have it. This document describes a way to do just that.

Terminology

First it is helpful to define some terminology.

The term DMO or dmo as used herein denotes a "Digital Media Object." A DMO is usually a file, but it could also be part of a file or it can be replicated in multiple files, that contains a creative work subject to protection by methods and systems according to the invention. These can be, by way of non-limiting example, digital songs, videos, movies, electronic books, stories, articles documents, still images, video games, software applications and so forth—just to name a few.

We use the term play to cover the broad category of what a device does to a digital media object for the use by the user or owner. In the case of a digital music or video object, play is the correct term. For a digital picture, render is the term used to display the picture, but for uniformity, we will say that a computer or digital picture frame will play the picture. Similarly for a digital book. We say that an e-book reader device will play the electronic or digital book object.

The term User generally refers to the user of methods and systems according to the present invention and or their respective digital data processors. The person will, for example, buy and sell DMO's with that digital data processor.

A file system or filesystem is a method of organizing computer files to make it easy to find and access them. File systems may use a data storage device, such as a hard disk, CD-ROM, flash storage device, and can involve maintaining the physical location of the files. File systems may be local or remote. File systems may also be maintained in a single location or distributed among multiple locations.

The term volume or disk volume is a technical computer term referring to a single accessible storage area within a single file system, typically resident on a single partition of a hard disk. As above, a volume may be local or remote and/or maintained in a single location or distributed among multiple locations.

A fingerprint of a computer file or of a digital media object is a bit string (typically, a short bit string) that uniquely identifies the original data, of a much larger size, for all practical purposes just as human fingerprints uniquely identify people for practical purposes. Fingerprints are typically used to avoid the comparison and transmission of bulky data. Fingerprint functions are related to (and sometimes confused with) checksums, hash functions, cryptographic hash functions, and digital signatures.

Digital Media Objects

Our era of computers has seen the "digitalization" of many different media. Digital cameras have transformed the world of photography. Film is no longer used to capture a picture, rather a picture is captured with a digital camera and the image is recorded as a series of pixels, or numbers/bits. A digital picture is a collection of bits that encode the image in a certain may and packaged together as a computer file. The pixels of the image are arranged in a rectangle with a certain number of columns and rows. Thus somewhere in the beginning of the file, are these two numbers. There is much more information that can be specified about the picture. This information is often stored in the header of the file before the actual bits of the image. The information in the header is sometimes referred to as "meta-data" since it describes things about the image but not the image itself.

Meta-data in the header may specify information such as the camera, the shutter speed, time and date, the place or GPS coordinate as to where the picture was taken, and other things about the image. In addition, other information can be stored in this header, such as the photographer, the owner of the image, or a unique id representing a particular purchase of the image. The header might be sealed using encryption techniques to prevent others from changing this information. The image may be compressed using one of the standard techniques such as jpeg, tiff, postscript, bitmap, and many others. The image may or may not be encrypted.

FIG. 1 depicts various options for encrypting different parts of the file containing a digital media object in a system according to the invention. Thus, as shown in FIG. 1A, a digital media object 10 contains a header 12, along with a "body" 14 containing bits representing the digital song, video, or other file content. As shown in FIG. 1B, one option for encrypting the file includes encrypting the body 14 using a private key of the hardware device or software application that will be used by the user to render (or, more generally, "play") the object 10. As shown in FIG. 1C, another option is to additionally encrypt the header 12, albeit using a private key associated with the distributor, producer or owner of the digital media object. Further, as shown in FIG. 1D, a further option is to encrypt both the header 12 and body 14—both encrypted in accord with FIG. 1C—with the private key of the copyright owner.

Music has seen a similar transformation. Music is no longer recorded on a paper-roll, record or tape. It too has been digitized and a recording placed in a file with a header similar to that of digital pictures. The music encoding, number of bits per second of playback, pitch, volume, Dolby encoding, and the dynamic range. Other information may also be placed in the header, again, such as the owner, producer, song title, and a whole lot more.

Pictures, music, and other digital media often contain more precision than can be observed, heard, or sensed by people or by the rendering technology. Consequently, variations in the bits specifying the object may not be noticeable. Two images may appear identical even though their bit representations differ slightly. One the one hand, this provides a challenge when trying to identify an image from its file representation. On the other-hand, it permits embedding information directly into the image or music that is not noticeable but can be used to watermark the object.

Of course, movies, which essentially are a combination of images and sound have been digitized and wrapped in a file or multiple files with detailed meta-data. There are many different formats for movies as well. Since movies require a large number of bits, they are often stored in multiple files but usually within one main directory representing the entire movie.

Computers have been used as "word processing" devices or desktop publishing for many years. More recently, there has been an increase in electronic books, or e-books. Again, the contents of a book are recorded digitally usually in a file or multiple files within a directory. Once again, there is meta-data associated with the e-book, that may contain the title, author, number of pages, and much more information.

Many other types of media are similarly treated. Computer games, 3-D or holographic movies, karaoke, rock-band, maps, slide shows, maps, and more. We shall refer to all of these as "digital media objects."

Since digital media objects are just a file of binary data they can be easily copied. Unlike the physical counterparts, the copies are usually identical in that their binary specification are exactly the same. The meta-data may be the same or may differ depending on how the copy was made.

Typical Organization

Figure 2:
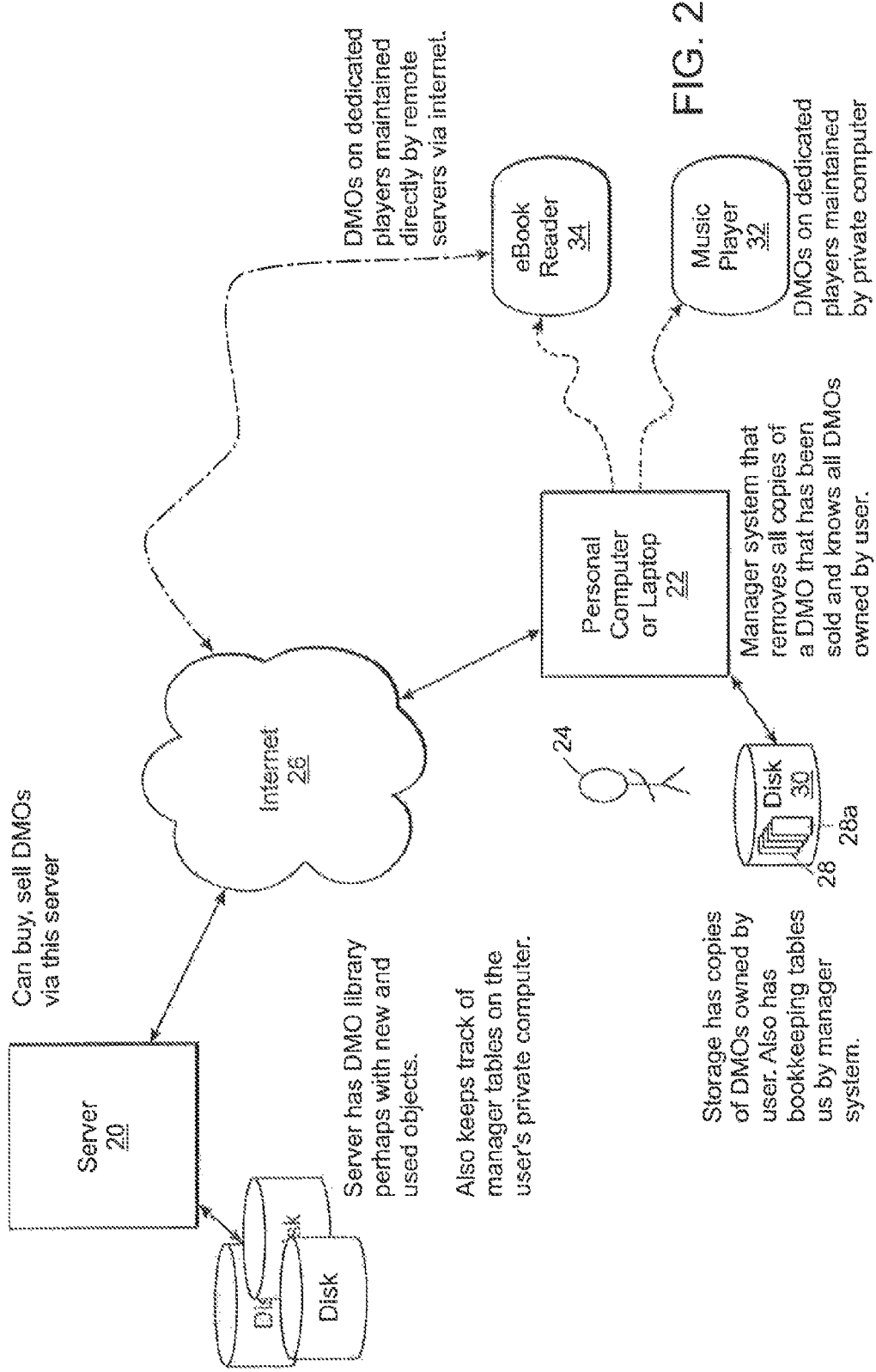
FIG. 2 depicts a system according to the invention.

FIG. 2 depicts a system for the management of digital media objects according to one practice of the invention. It will be appreciated that this is shown and described by way of example, and that other systems incorporating changes to that shown (and described) may fall are within the scope of the invention, as well. As shown in the drawing, There are many ways to install, maintain, distribute, sell, and other operations involving DMO's and their use. In a typical use case (see FIG. 2) of a system according to the invention, there is a server digital data processor ("server") 20 that is accessed by and in communications coupling with a client digital data processor, e.g., private computer 22 of a user 24 via the internet 26. The server 20, which is typically remotely disposed from the client digital data processor (or "client") and which is therefore referred to occasionally herein without loss of generality as the "remote server," stores original versions of the DMO's 28 for this user 24 (as well as for other users). The user (a term which is typically used herein to refer to an act of the client digital data processor, e.g., under the control of and/or at the behest of its human owner and/or operator) may upload or download his or her DMO's between his or her private computer and his or her storage area on the remote server. Every non-new DMO stored in the remote server 20, is owned by some user's account. The user's account has a pointer to the DMO stored on the disks associated with the remote server.

For a DMO to be offered for sale, it is first copied to the remote server and stored on the disk. The user's account points to the place on the disk where the DMO is stored. All copies of the DMO must be purged from the user's private computer. When this is confirmed, the DMO can be offered for sale.

To buy a DMO 28*a*, a user places an order. When a matching DMO is offered for sale a transaction occurs, that involves an exchange of money and the pointer to the object is moved from the previous owner to the new owner. The new owner's private computer 22 will download the object 28*a* from the remote server 20 and store it on the local hard drive 30 of the private computer 22. Later, the DMO player 32 is connected to the private computer 22 and the DMO 28*a* is copied to that device 32.

Referring to FIG. 2, digital music can be played on a computer 22, a dedicated music device 32, etc. Electronic books can be read on computers 22, dedicated e-book readers 34. (The computer 22 and devices 32, 34 are collectively referred to herein as "client digital data processors"). The digital media objects may be downloaded from a server 20 via the internet 26. They may first be stored on a computer 22 and then transferred to a dedicated media device, e.g., 32 or the dedicated media device, e.g., 34 can directly connect to the remote server 20 via the internet 26 for such download.

When the dedicated device, e.g., 34, directly communicates with a remote server 20, that server 20 can usually control the objects on the device, e.g., 34, including remotely deleting them. When the digital media objects are played on a computer 22 or when dedicated devices, e.g., 32, connects or communicates with a private computer 22, then DMO management software which is resident on the private computer 22 (and which can exchange status information with the server regarding DMOs owned, sold, awaiting sale, etc., by the user of that computer) manages the content on the device, e.g., 32. That management software is referred to alternatively herein the "Manager Application," the "management system," the "management software," and the like.

Ownership Concerns

Physical objects can be lent to friends, used, and then returned or resold. Ownership of an object often means physical possession. Owning an object often implies that one can sell that object. In the prior art, ownership of digital objects do not have this feature. It is easy to make an unlimited number of copies, sell these away and still have the original. Systems according to the invention overcome this by ensuring that, when a user sells a DMO, he/she is divested of all current and future copies—until he/she buys another. Thus, systems according to the invention allows one to buy, sell, return, and transfer digital objects in very much the same way as physical ones.

Functional Description

The following is a functional description of the invention as it pertains to an exemplary system for music management, sometimes referred to herein as ReDigi™. In alternate embodiments, similar systems can manage other types of digital media, such as, by way of non-limiting example, digital songs, videos, movies, electronic books, stories, articles documents, still images, and so forth—just to name a few.

Figure 3:
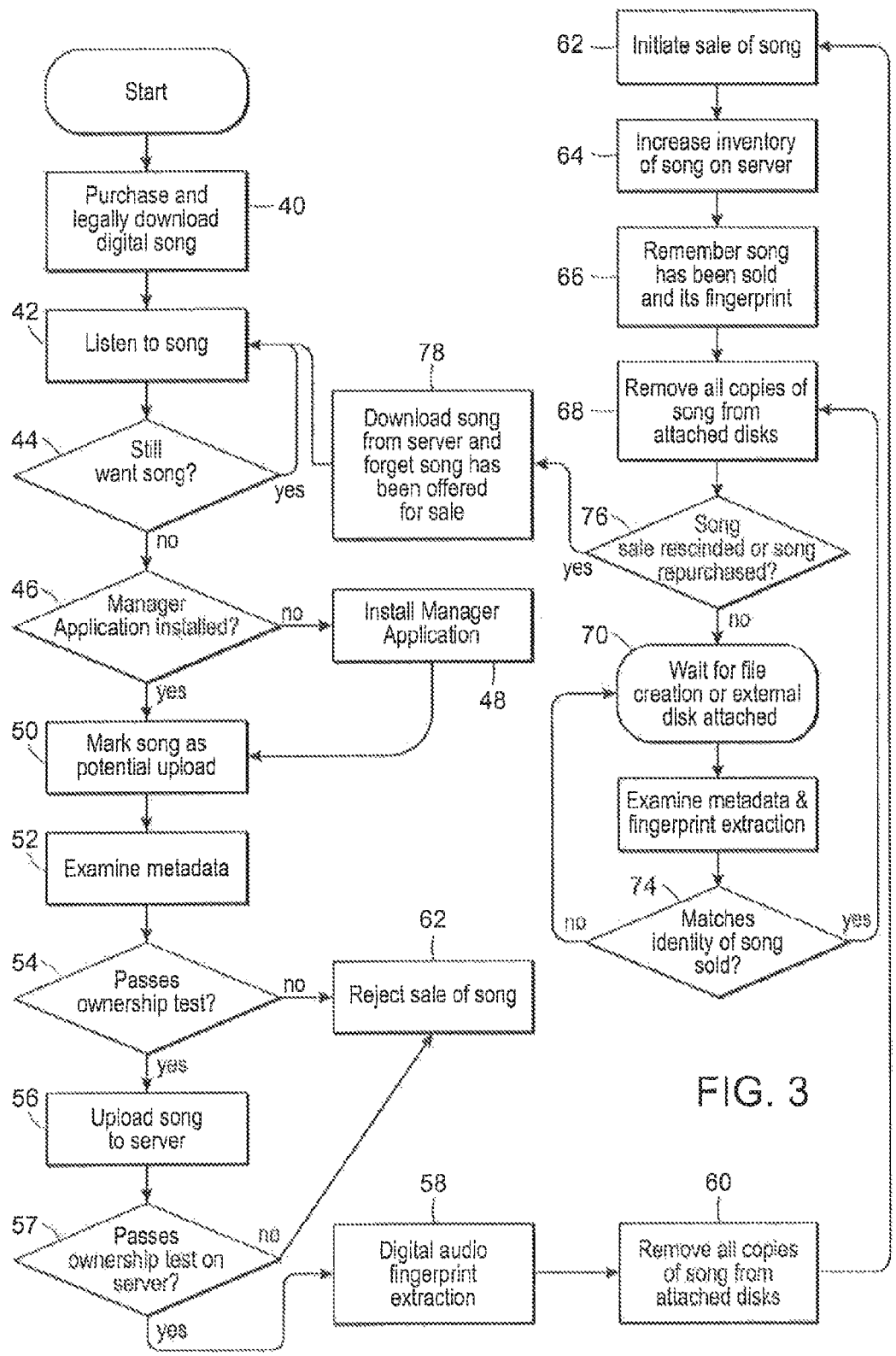
FIG. 3 depicts processing of a music file in a system according to the invention.

In one exemplary embodiment, illustrated in FIG. 3, a system according to the invention processes a music file in order to manage a single song. As shown in the drawing, a song can be legally purchased and downloaded by an owner. See step 40. It can be played by the owner until the owner wishes to sell the song. See steps 42-44. If the song passes all validity checks (including examination of metadata and fingerprint extraction) applied by the Manager Application (step 54) and by the server (step 57) after the song is uploaded (step 56), the song can be sold (see steps 46-60). Otherwise, sale is rejected (step 62). In the case the sale is permitted to proceed, the song is offered for sale by the server (step 64), is logged as sold (step 66) and if new copies of the song appear, e.g., as detected by waiting for external disk attachment or file creation (step 70) and examining for match with the sold song metadata and fingerprints of newly added files (steps 72-74), those are also deleted from the owner's system (step 68) until and unless the sale is rescinded by the owner (step 76). Until the song is actually sold, the sale can be rescinded (step 76) and the song can be downloaded (step 78) and its offer for sale forgotten. Note that if the song is repurchased, it will have different metadata, watermarkings, and fingerprints, so it will not match the identify of a sold song (step 74 will fail).

A Recycled Digital Media Store

A registered member of a recycled digital media "store" that operates according to the invention has numerous benefits. Members can access a catalogue of recycled, licensed, digital media. Music, movie, book and game fans will enjoy their favorite artists, actors and authors showcased in a high-quality application that is easy and fun to use. The net result is a low cost unparalleled user experience and a compelling legal alternative to piracy.

Members can transfer unwanted digital media to the store in exchange for purchase credit. This media is re-inventoried in the store. A member can buy any media listed there with these credits. Such a system can provide the ability to get music, books, movies, and games with no cash out of pocket. In some embodiments, if the account does not have sufficient credits to cover a purchase, the purchase can be completed in the traditional way, e.g., by credit card, etc.

Individual artist, author and producer areas allow members to build a direct relationship with fans, old and new, across the world. This service facilitates the development of revenue streams through the sale of downloads, merchandising, concert tickets and more, as well as, earning a share of the revenues created through advertising and premium businesses. Powerful, real-time, in-depth reporting is standard to participating labels and artists, authors, etc.

> The Market for Digital Media has grown rapidly in the digital music space and is growing even faster with the introduction of digital movie downloads and digital books. Historically, all forms of media have moved to the "used" or "re-sale" marketplace.
>
> Why re-sale? Typically the markets for resale are driven by VALUE, those purchasing in that category are most often driven by the ability to save money while getting the exact product they want, not an imitation, rendition or low quality copy.
>
> Digital fingerprinting technology is used to identify and tag uploaded media, thereby securely removing all synced copies of the same file(s).

Embodiment

In some embodiments, management software (e.g., the aforementioned Manager Application) can run on a personal computer or laptop 22 that has connections to the internet 26. For example, there can be one or more remote servers 20 providing the service of purchasing, selling, inventory, and re-inventory of new and used digital media objects 28. There can also be remote servers that provide digital fingerprinting and identification services.

In some embodiments, a personal computer 22 can be used by a user to buy, sell, and/or manage his or her DMOs 28. Dedicated music players 32, movie viewers, e-book readers 34, and the like, can connect to the personal computer 22 for DMO uploading and downloading. When each of these devices, e.g., 32-34, are attached to the personal computer 22, they can appear as a removable file system to the computer.

In some embodiments, the systems and methods of the present invention, e.g., the management software embodying the features disclosed herein, can run on portable digital devices, such as smart phones, or PDA's, or can execute on remote servers that control the content of dedicated devices. The modifications necessary to achieve these modifications are within the scope of this invention. An exemplary embodiment of which is described below.

For example, digital media objects can reside on "read-only" physical media, such as a CD, DVD, ROM, photographic paper, or physical book. They can also reside on more volatile devices such as RAM, disks, SSD, or flash memories. The digital data or bits of such volatile memory devices can be easily written or re-written many times. A digital media object can reside on any or all of these forms of data storage. Such data storage, especially flash memory can be found in all sorts of consumer devices. A single digital media object, say a digital song, can reside in a computers hard disk in one or more files, but can also reside in the flash memory of a portable music player, as well as on a backup disk drive or external flash memory.

In preparation to offer a digital media object for sale, the goal is to delete, expunge, remove, or disable all of the copies of this digital media object that are owned by seller so that there is only a single copy of the DMO whose ownership will be transferred during the sale. While it may be impossible to delete the copy of a digital media object that is stored on a disconnected, powered off disk drive, the management system software makes a best effort to remove all copies. To this end, the management system software preferably remembers the sale of this digital media object so that any time in the future, when a disconnected device is reconnected, the system will retry to remove it as well. A fingerprint of the DMO is used so that even if the metadata of a file containing the DMO is modified, it will still be recognized as a copy of the object sold or offered for sale. Similarly for portable digital music players; whenever they are connected to the computer, the manager will attempt to remove copies as well.

The working of an exemplary management system is described in two parts. The first part is the typical execution and assumes everything has been setup and initialized. The second part is the initial setup and handling other cases. The management system software runs on the private computer, smartphone, or other personal computing device. It communicates over the internet with the servers. The working of an exemplary server-side system is described as well.

Typical Operation

In one exemplary embodiment, the manager system uses the contents of several tables in order to know what actions need to be taken when a file is created, deleted, or modified. These tables are maintained on the local personal computer and can be mirrored on a remote server. When not in use, the tables are encrypted to prevent easy manipulation by rogue processes. Although not absolutely necessary, the private keys should be backed up on a remote server. In addition, the servers maintain a list of DMO's that have been bought or sold by the user. These lists are periodically sent to the management system software on the private computer to ensure they are up-to-date.

Figure 4:
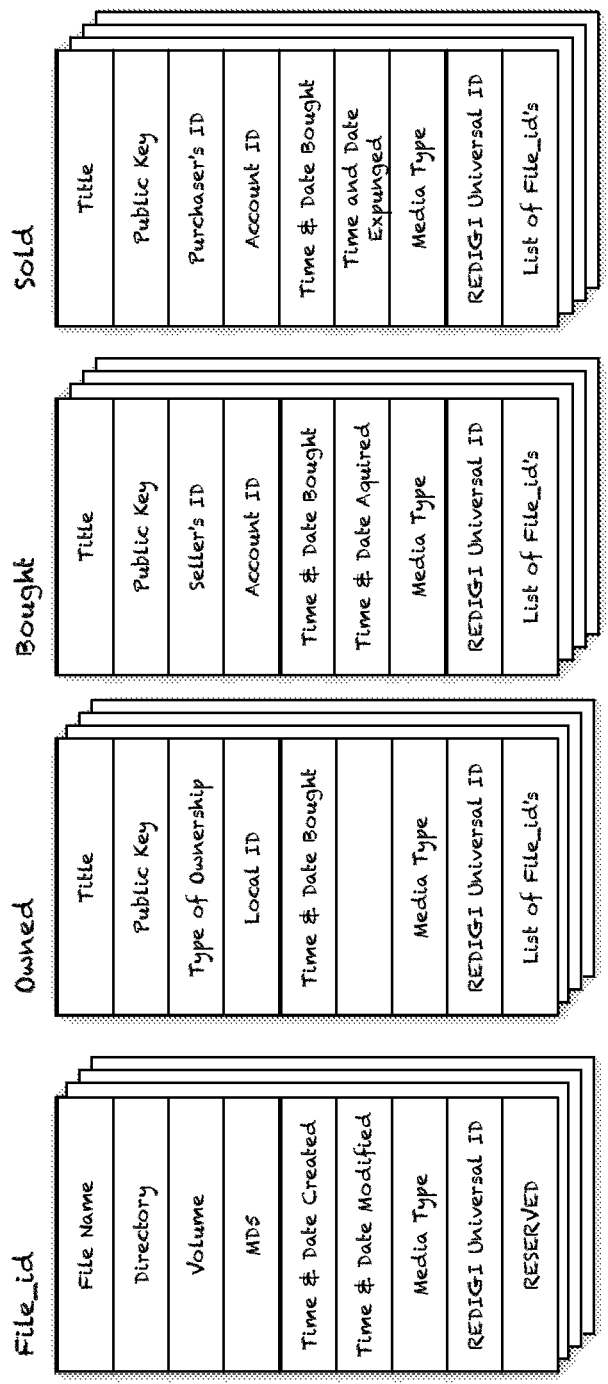
FIG. 4 depicts tables used by a system according to the invention in order to know what actions need to be taken when a file is created, deleted, or modified.

FIG. 4 specifies some exemplary fields for each entry in the table. Since files may be contained on external storage or storage contained within external devices or players (referred to as a volume), a complete specification of the file is needed. The ReDigi™ Universal ID is a globally unique ID and used to connect the file with entries in the other tables. The public key in the owned, bought, and sold tables refers to a way to decrypt the DMO. The entries in these three tables may contain a list of files that contain this DMO.

Each entry of the tables can contain the globally unique identity of the DMO. This is known to the remote server, which has a more detailed set of features and identifying markers for the object. Some objects can also have a decryption key. The entry for a DMO can also contain a fingerprint of the file, e.g. the MD5 sum as well as a list of files that represent or "contain" this DMO. It may also contain other identifying features that depend on the actual media type.

Some of the tables are as follows (see FIG. 4) for the fields of each entry in the tables):

file_id: This specifies a file. The file can be on the local machine or on a file system that is only temporarily attached. This other file system might be a dedicated device or an external drive, e.g. a flash drive.

dmo-owned: This is the set of DMO's that are owned by this user. Each could be contained in many different files on many different devices.

demo-sold: The set of DMO's that were sold by this user.

dmo-bought: The set of DMO's that were purchased by this user.

dmo-multiple-transactions: The set of DMO's that have been bought and sold multiple times. These entries represent files that should be watched.

dmo-suspicious: DMO's that have been sold but reappeared on the system

In some embodiments, whenever a file is created, deleted, or modified, a maintenance function of the management software is invoked. This invocation works in the same way as virus protection software. Under the Microsoft Windows operating system, it is possible to register a routine to be invoked on all these operations. Under the Macintosh Operating System, a similar mechanism exists for the file indexing service, "spotlight" If other operating systems do not provide this ability, then a periodic scan over all the files in the system can be performed in the background to detect the status off all the files.

In the Microsoft Windows operating systems, care is needed to avoid excessive invocation of this routine. When making a copy of a file, the routine will be called numerous times, as the new file is continually updated. Even worse is what happens when an entire directory, containing many files, is copied. To avoid numerous calls, a delay in inserted. It is not necessary for the management software to immediately check each new file creation or modification. All that is necessary is for each file to eventually be checked.

On each invocation the following actions occur. Note that the first action is to fingerprint the file using MD5 (message digest 5)—hash value of the entire file (very fragile). Thus, if the owner makes a copy of a file, we will be able to notice that the files are the same.

|  | DMO-Owned | DMO-Bought | DMO-Sold | None |
|---|---|---|---|---|
| Creation | add to owned | increase count | delete file or issue warning | add to scanned |
| Accessed |  |  | delete file or issue warning |  |
| Deletion | remove from owned | decrease count | rescind any outstanding warning | add to scanned |
| Modification | treat as if delete then create |  | delete file or issue warning | add to scanned |
| Purchase |  | add to bought |  |  |
| Sell/gift |  |  | add to sold |  |

Actions in Response to a File Creation Notification

In some embodiments, since a user can make multiple copies of any DMO's that he or she owns, each copy should be recorded in the DMO-Owned or DMO-Bought table and checked against the DMO-sold. Although it is not necessary to record this information for DMO's that are owned, it makes the task of offering a DMO for sale much faster. If a DMO has been sold, the newly created file must be removed from the system either under management control or by issuing a notification warning the user that the DMO has been sold and the file must be deleted. The exception is when the user has access to a DMO but does not have sufficient computer privileges to delete the file. For example, there are two users who share the same personal computer. Each user may be able to access files in the other's account but does not have permission to delete those files. Every modern, advanced operating system has a set of read, write, and deletion permissions associated with every file and every user account. Anyone skilled in the art of computer programming knows how to check these permissions.

It is possible that the file creation is the result of a copy from a removable device containing that file, in such a case, both the new and the old DMO files must be deleted. A DMO file found on device that has just been attached is considered to be a file creation, and will be either recorded or deleted depending on it being identified as owned or sold. If Non-DMO files or DMO files that cannot be validated as resulting from an on-line download purchase are ignored since they cannot be sold in the future and are assumed not to be part of the system of objects being tracked. A methodology for carrying out these steps is illustrated, by way of non-limiting example, in the code that follows,

```
def on_file_creation(file_id):
    (file_name, file_meta_data) = file_id
    if (dmo_id = contained_in_table(DMO_owned, file_id )):
        add_to_owned( dmo_id, file_id)
    elif (dmo_id = contained_in_table(DMO_sold, file_id )):
        popup_query_to_user
        ("The_contents_of_the_object_in_file",
            file_name,
            "_has_already_been_sold\n_Will_remove_file.\n",
            "_If_this_is_in_error,_please_contact_re-digi.com")
        remove_file(file_id)
    else:
        add_to_files_scanned(file_scanned, file_id)
```

Actions in Response to a File Deletion Notification

In one embodiment, the response to a file deletion, does not depend on the number of copies of a DMO; the record of the deleted file associated with a DMO is removed and the count is decreased. When the count goes to 0, however, the DMO record remains in the table. If a DMO is owned it should continue to be tracked since it can be created again. For example, the file could have been deleted in order to save storage space. It could still be sold in the future. If the DMO was sold, then this deletion is just the right action to be taken. If the file was neither bought nor sold, it is not part of those that are tracked. A methodology for carrying out these steps is illustrated, by way of non-limiting example, in the code that follows,

```
def on_file_deletion(file_id):
    (file_name, file_meta_data) = file_id
    if (dmo_id = contained_in_table( DMO_owned , file_id )):
        removed_from_owned( dmo_id, file_id)
    elif (dmo_id = contained_in_table( DMO_sold , file_id )):
        decrease_file_count(dmo_id)
```

Actions in Response to a File Modification Notification

In one embodiment, a file that is modified can be treated as a deletion followed by a creation. There are optimizations but they make the code harder to understand and maintain. It is assumed that once a file has been modified, it is still possible to recreate the old, non-modified file. Actually, all that is needed is the fingerprints of the original file. This is already in the tables. A methodology for carrying out these steps is illustrated, by way of non-limiting example, in the code that follows,

```
def on_file_modification(file_id):
    old_file_id = temp_create_file_from_backup(file_id)
    on_file_deletion(old_file_id)
    on_file_creation(file_id)
    delete_file(old_file_id)
```

Actions Performed by the User Through the Management System

Using an embodiment of the management system discussed in more detail above, there are at least two things a user can do. He or she can purchase a new digital music object. In this case, there will be a download of the DMO just purchased. The user can create many copies of the object. He or she can get rid of such an object, either by selling it or by passing it on to someone else. In this case, all copies of the object must be removed or delete. Actually, it should be passed on (the bits passed) to the new copyright owner.

When an object is purchased, a file is usually downloaded to the computer or device. It is the job of the manager to verify both the identify of the digital media object and ownership. The most straightforward way is when the digital media object seller will verify the transaction.

Before a DMO is sold, it must be checked for validity. It must be in the owned table. Then it all depends on the object type and its protection, drm, etc. A methodology for carrying out these steps is illustrated, by way of non-limiting example, in the code that follows,

```
# assume dmo_id is an entry owned,
# account is id of user (from whence it was bought)
def confirm_ownership(dmo_id):
    for file_id in file_list_in_owned(dmo_id):
```

-continued

```
        account = get_account_field_from_bought(dmo_id)
        # find at least one file with this dmo with valid ownership
        if (redigi_uid = get_redigi_uid_from_file_id(file_id)):
            if redigi_server_confirm_ownership( redigi_uid, account ):
                return TRUE      # remote server confirms ownership
            else:
                return FALSE     # server indicates different ownership
        elif known_standard_encrypted_file( file_id ):
            key = get_key_field_from_bought(dmo_id)
            (header,body) = decrypt_file( key,   file_id )
            if account in header:
                return TRUE      # header contains correct account id
    return FALSE   # could not confirm ownership
```

The confirm ownership routine is used when offering a DMO for sale. A methodology for carrying out these steps is illustrated, by way of non-limiting example, in the code that follows,

```
# dmo_id is a record that contains most of the fields in the dmo_owned
# table entry
def on_purchase(dmo_id):
    add_to_owned( dmo_id , null )
    add_to_bought( dmo_id , null )
# assume this is called only once dmo_id is confirmed
#    to be in owned table.
def on_sell(dmo_id)
    if confirm_ownership(dmo_id) == FALSE:
        return FALSE
    add_to_sold(dmo_id)
    for file_id in file_list_in_owned(dmo_id):
        remove_file(file_id)
    removed_from_owned( dmo_id, file_id)
    return TRUE
```

Preventing or Discouraging Access to DMO that has Been Sold

In one embodiment using the detection scheme described above, there are several actions that are taken to prevent or discourage access or use by a user of a DMO that the user has sold. For customers in good standing a warning message is flashed on the screen and a notification message issued is enough of a discouragement. The user may have simply not known that he or she still had access to a DMO copy that he or she has sold. Repeated access and playing of a song that the user has sold requires stronger action on the part of the management system. Since the identification might be in error, the file may be moved to a special quarantine directory making access difficult. Upon further infractions, the user is prevented from any further offers for sale of DMO's. An even further discouragement is possible by freezing the user's account.

Initialization

In some embodiments, the initialization phase goes through all the files owned by the user and classifies their content and places these results in a set of tables. For example, this is similar in function to virus detection software. It first does a full scan of all the files. Later, it is only concerned with new and modified files.

In one exemplary embodiment, when a new file system or file volume is attached to the computer, the initialization routine scans though all the files on it. Thus, the initialization phase may be invoked many times (as devices attach and reattach).

Exactly which DMO's found in files are classified as "owned" is a policy decision. A liberal policy is to assume every DMO was legally acquired. A highly restrictive policy assumes that only DMO's with DRM that restrict playing to this device are legally owned and all others are not and may not be resold.

A methodology for carrying out these steps is illustrated, by way of non-limiting example, in the code that follows,

```
# This examines a file
def scan_file(file_id):
    (file_name, file_meta_data) = file_id
    if is_redigi_file(file_name):
        dmo_id = extract_dmo_id(file_name)
        add_to_owned( dmo_id, file_id, 'redigi' )
    elif is_ordinary_media_file(file_name, media_type):
        header_info = extract_header(file_name)
        dmo_id = looup_object_from_header_info( header_info)
        add_to_owned( dmo_id, file_id, 'ordinary' )
    elif guess_media_type( file_name ) == media_type:
        dmo_it = guess_dmo_id( file_name)
```

```
        add_to_owned( dmo_id, file_id, 'guessed' )
    else:
        add_to_ignored( file_id)
    add_to_scanned( file_id)
```

The Server Side

The management system software communicates with the server software. A web browser can also be used to communicate and interact with the server software.

The server controls and maintains a set of databases that are used to support various functions such as: user accounts, DMO maintenance, deep verification, bookkeeping of credits and financials, uploading and downloading of DMOs, and matching offers to sell with requests to buy particular DMOs.

Maintaining user accounts is required for the system to work but the particulars, such as account creation, verification, login, session-ids, cookies, etc., are well known. What is relevant to one embodiment is the additional information kept with the account, outlined below, in a way of a non-limiting example.

| Field | Description |
| --- | --- |
| Preferences | The length of time a DMO that has been offered for sale will remain for sale or an offer to buy will remain in place. When the purchase of a DMO succeeds, the DMO can be automatically downloaded to one or more of the user's private computer or devices. |
| Box Size, Box capacity, Box location | The box is a collection of the DMO's owned by the account and currently residing on the server dedicated to the exclusive use by this account. There is a capacity both in the number of DMO's and in their total size. |
| DMO identities used | This field is used to detect fraud. DMO's purchased on-line often have an identify, email, username, or some other customer identification stored in the meta-data. A user who has an excessive number of such identifies is a warning signal of potentially trying to sell DMO's that he or she does not own. Similarly identities that are also found in other user accounts raise similar warnings. |
| IP addresses of machines with management system software | Each machine with a working cop of the management system software can download a copy of a purchased DMO. Consequently, the server limits the number of machines on which the management system software installed. Also monitored is the number of times the management software is installed and uninstalled. |
| Number of Infractions | An infraction is a violation of the legal use of the system, such as non-deletion of DMO's offered for sale, multiple attempts to offer non-verifiable DMO's for sale, or exceeding the limits of identities or machines as recorded in the above two fields. |

The BOX

In one embodiment, DMO's can be uploaded to or downloaded from the server. A table containing pointers to the DMO's is referred to as a box. Each DMO is owned by used one user and at any time, there is only one box that points to a DMO. There are several operations that can be performed on a box, including those in the following list:

| | |
| --- | --- |
| statusOfBox( ) | This returns the objects, their type, size, and status - for sale, recently purchased, exclusive copy (e.g. there are no known copies on any of the user's devices or machines). |
| putFileIntoBox( file, nickname ) | The management system software uses this interface to upload a copy of a DMO to the server. |
| getFileFromBox ( nickname ) | The management system software uses this interface to download a copy of a DMO. The server then records the fact that this DMO is no longer exclusive on the server. This is also used when a DMO is purchased from another user. |

| | |
|---|---|
| insertFileIntoBox( nickname ) | This is part of the process of transferring ownership from one user to another. In one atomic transaction, a pointer to an instance of a DMO is deleted from one box and inserted into another box. |
| deleteFileFromBox( nickname ) | This is part of the process of transferring ownership from one user to another. It can also be invoked from the management system software. |

DMO Verification

In one embodiment, verification of a DMO offered for sale is necessary in order to ensure that the meta-data that identifies the contents of the DMO is correct. There are two aspects to the verification process. One is to verify that the DMO was purchased by the user. The second is that the digital object is what it claims to be. For example, a devious user may try to sell a song that appears to be the Beatles' song "Yesterday" but when played, the music is an advertisement for some product.

In one embodiment, verification of ownership is based on a set of criteria and characteristics of the DMO, each of which either increases or decrease the level of confidence in ownership. Some, but not all characteristics are:

| | |
|---|---|
| User identification | Many sites store one or more versions that identify the user account that did an on-line purchase of the DMO. If this user identification matches those of other DMO's owned by this user, then increase confidence of ownership. If the user identification is similar to the user account name on this seller, then also increase confidence. For example, if the user name for an iTunes purchased song matches the user name of the reseller's account name for this service, give extra bonus in confidence. |
| Exclusive use of identification. | There are no other users in the system that have ever had a DMO with this user identification. |
| No obvious signs of metadata editing | Many programs allow one to edit the metadata of a DMO Some of these programs add fields to the metadata that state the program used to edit the metadata. |
| Valid proprietary fields inserted by the distributor | Many online DMO retailers insert special hidden fields to show that they sold the file. Examining a large number of DMO's can be used to identify their special hidden fields. |

Upon transfer of ownership of used DMO's that are sold through the service are first stripped of all identifying marks and fields in the metadata. The new owner will not be able to tell who was the previous owner. Then, identifying marks of the new owner is inserted into the DMO metadata. Finally, special watermarks identifying this transaction and this service provider are inserted into the DMO itself. For example, in the case of a digital song, a digital watermark is inserted by modifying the music in an inconspicuous manner.

A DMO that was purchased as a used DMO through this service will thus contain a recognizable watermark, perhaps acoustic in the case of songs and movies or graphical in the case of e-books or pictures. Any DMO containing such watermarks can be easily verified as to the true owner of the DMO making verification of such DMOs very easy and straightforward.

The second type of verification, that of ensuring the metadata correctly identifies the content of the DMO, can be accomplished, in one embodiment, by the use of a master fingerprint table. Each instance of a DMO contains a copy of the same contents as the master copy. For example, the music of any instance of the same digital song should sound the same. We assume that different encodings of the same DMO contents sound, look, or render in a similar way. A fingerprint of the content is stored on the server. Every work offered for sale is verified as follows. A fingerprint of the content is generated. This fingerprint is compared to the fingerprint on file in the server of the work that corresponds to the work's identification as specified in the metadata. For example, if the metadata of a song claims it is the Beatles' song "Yesterday" then a acoustic fingerprint is generated of the music in the DMO. This fingerprint is compared to the fingerprint that was generated from a known valid DMO of the same song. The fingerprint need not match exactly, but should be close enough. Note that this task is significantly simpler than the task of identifying a DMO without knowing what it is. For example there are many services that can identify a song from just a few seconds of its playing. That requires comparing the fingerprint of a few seconds of music with an entire collection of millions of songs. There are many ways to generate fingerprints. A common approach is to apply a Fourier Transform to the signal mapping it from the time domain to the frequency domain. Characteristics of the resulting frequencies, such as max, min, average values, signal entropy can be used along with other more typical music features such as timbre, The verification task using fingerprints is much easier than identification since it need only ensure that the fingerprint match the fingerprint of what the DMO claims to be.

The Matching

In some embodiments, the matching between DMO's offers for sale and request for purchase consists of the following actions making by the servers and making use of its internal tables. A DMO can be offered for sale before, during, or after there is a corresponding request for purchase. Consider each case separately. Before delving into the details, it is necessary to describe how a DMO can be identified.

In the case of digital songs, each song requires a unique representation. A song is often identified by a quadruple of Title, Artist, Album, and Year released. Unfortunately, not all songs fit this identification model. Some songs are released as singles and are not associated with an album. Some songs may have multiple release dates. Yet other songs may have slightly different ways of writing the title, depending on the language of the consumer, e.g. A French as well as an English title, or a title that is transliterated using a different alphabet. In addition, classical music may be specified by both the orchestra and the conductor.

In some embodiments, a standard database is used that provides a unique number or identifier for each unique musical composition. The database can be searched using a partial specification of the object and can also assign the same identifier to the same musical composition even when there are multiple titles, release dates, etc. Given a DMO, the metadata must specify these fields in sufficient detail to uniquely identify the object. These fields are used as search terms for the database. Any DMO offered for sale, will first have these fields extracted from the metadata, a search performed on the database, and its unique identifier then used as an internal DMO identifier.

When a DMO is offered for sale before there is a request for a purchase, the server updates the available inventory for this particular object based on its identifier as described above.

A buyer will specify some or all of the search terms. This produces a list of identifiers that match the search terms. For each of these identifiers, a list is presented to a potential buyer with a notation of which objects have non-zero inventory. When the potential purchaser indicates a willingness to buy the used DMO, the inventory is searched and an atom database transaction will exchange coupons, credits, cash, as well as exchanging ownership.

There may be items on the list that have no inventory but that a user wishes to purchase. This is a case of a buy request occurring before an offer to sell has been made. The inventory table entry for this object indicates this fact. As soon as there is an offer to sell this object, the server checks the inventory and will see the request to buy. A match occurs and an atomic database transaction will exchange coupons, credits, cash, as well as exchanging ownership.

The third possibility is that there are no requests to buy nor offers to sell for a particular object but at roughly the same time, a request and an offer are made by two different users. A naïve implementation could result in a situation in which the offer to sell fails to see that there is a request to buy and the request to buy fails to see the offer to sell and both get placed in a wait queue and no match occurring until some future request or offer is occurs. Note that the buyer has already seen an empty inventory and so is expecting to wait for an offer to sell. So, whenever a request to buy is placed in the wait queue, a timer is set so that the request to buy will check the sell queue again in the near future. This ensures that a match will always occur no matter what the timing.

Gifting

In one embodiment, an exchange of ownership and corresponding monetary instruments can take place between three users, when there the transaction supports gifting. The match process described above involves a database atomic transaction that atomically performs several database updates. The pointer to the DMO is switched from one user's box to another user's box. The price of the DMO is subtracted from one user's account and added partially to another user's account and the remaining to the media store's account. To support the ability to gift a DMO, the atomic database transaction involve the database accounts of three user's in a manner that will be evident to those skilled in the art in view of the teachings hereof.

Increasing the Chance of Matching

In some embodiments, provisions are made to give a seller a better chance to have his or her DMO's bought. One way is to help the seller to offer the DMO's in the right time. There are three subsystems.

One subsystem uploads DMO's to the box, purges them from the private computer, and then offers them for sale. This process can be under direct control of the seller. But if the seller wishes to offer many DMO's for sale and there is insufficient room in the box for all of them, some of this process can be automated.

The user specifies all the DMO's that are offered for sale using a second subsystem. This subsystem sends the list to the server. Any DMO's for which there are buyers waiting, are automatically uploaded to the box, purged, offered for sale by making use of subsystem one, however under the control of subsystem two. If there is still room in the box, DMO's that have been recently been involved in transactions and then offered for sale, again sing subsystem one. The server knows current and past demand and can accurately priority order the DMO's so that the most likely ones to be bought are the first to be offered for sale.

Based on the set of DMO's offered for sale (accumulated via subsystems one and/or two), it is possible to infer what other DMO's a user may have on his or her private computer. Correlating these with known demand of requests to buy, a third subsystem can send a list of DMO's to the management system software on the personal computer to see if there are any DMO's there. If so, the user is asked if he or she would like to offer them for sale. This works in much the same way as a recommendation system, however, it is based on what a user wishes to sell rather what the user wishes to buy.

Optimizations

Optimizations of the foregoing are discussed below. These may be employed individually and/or in combination with one or more of the teachings above.

The file size can be an easy filter to quickly eliminate files from consideration. Movies are at least dozens of megabytes in size. Songs are smaller. E-books are not dozens of kilobytes in size. Pictures usually larger.

The file extensions can be an excellent first level indicator but should never be trusted. It identifies the first thing to try.

The tables are best organized as hash tables to quickly find records. When more than half the entries are occupied, the table size can be doubled and the entries re-mapped.

Rather than uploading a DMO that is sold, in some situations, it may be sufficient to simply notify the remote server by sending the ID of the object. This can be considered a highly compressed version of sending the whole object.

When several users upload the same DMO to the server, it may be possible for the server to store only a single copy of the DMO and have each user's box point to this single copy. It is a legal decision whether or not the server must maintain distinct instances of each DMO.

To identify the DMO contained in a file, there are three cases to consider: The file is encrypted in its original form. The file is unencrypted and unmodified. The file is unrecognized and requires more elaborate fingerprinting.

The match is much easier since the database size is smaller than the usual complete contents. The match is against only those DMO's that have been sold. Two steps: when sold and when any file is created for first seen, e.g. device is connected.

When scanning all files. For each file, do deep search (fingerprint) to have table of owned objects and the files in which they reside. (can do this lazily) Whenever a new drive or device is connected, do a deep scan Maintain fingerprint (features) in the owner table (or even unclassified table). When an object is offered for sale, we download the features and match it against all the objects in the table. It is easier to match a particular song rather than to identify the song.

Described above are systems and methods meeting the objects set forth herein. It will be appreciated that the embodiments illustrated and described herein are merely examples of the invention and that other embodiments incorporating changes thereto fall within the scope of the invention.

In view of the foregoing, what we claim is set forth beginning on the pages entitled "Claims," following Appendix A.

APPENDIX A

Executive Summary

ReDigi™—The Worlds First Recycled Digital Media Store™

ReDigi™ users access the world's only catalogue of re-cycled, licensed, digital media.

Music, movie, book and game fans will enjoy their favorite artists, actors and authors showcased in a high-quality application that is easy and fun to use. The net result is a low cost unparalleled user experience and a compelling legal alternative to piracy.

Members can transfer no longer used digital media to the ReDigi™ store in exchange for purchase credit.

ReDigi™ members can earn ReDigiBucks™ by inventorying their unused music on ReDigi™, by searching from ReDigi™, by Shopping on ReDigi™—then buy any media listed on ReDigi™ with credit from their ReDigi™ Bank account—all very cool, get music, books, movies, games with no cash out of pocket, or if the ReDigi™ account is a little low, its ok to purchase the traditional way.

Promoting media on ReDigi™ is free, individual artist, author and producer areas allow members to build a direct relationship with fans, old and new, across the world. ReDigi™ facilitates the development of revenue streams through the sale of downloads, merchandising, concert tickets and more, as well as, earning a share of revenues ReDigi™ creates through our advertising and premium businesses. Powerful, real-time, in-depth reporting is standard to participating labels and artists, authors, etc.

What is ReDigi™

ReDigi™ is short for Recycled Digital Media.

The Market for Digital Media has grown rapidly in the digital music space and is growing even faster with the introduction of digital movie downloads and digital books. Historically, all forms of media have moved to the "used" or "re-sale" marketplace. This is the primary market which ReDigi™ has targeted.

Why re-sale? Typically the markets for resale are driven by VALUE, those purchasing in that category are most often driven by the ability to save money while getting the exact product they want, not an imitation, rendition or low quality copy.

ReDigi™ uses proprietary digital fingerprinting technology (ReDigiPrint™) to identify and tag uploaded media, thereby securely removing all synced copies of the same ReDigiPrinted™ file(s).

ReDigi™ uses a proprietary ReDigiPrint™, DPP, tag that allows legal transfer and sharing of media files.

Cool ReDigi™ Features

Accessibility & Purchasing Options:
Mobile Access
Online Access
Recycled
New
Cool User Features
Great credit for used digital media
Save money on digital media purchases (Discounted New/Used Prices)
Fun and easy to use
Integration with FanAction™ Tickets, find events that match ReDigi™ music purchases in the users area and provides easy digital ticket purchase.

ReDigi™ Benefits
Significant Increased Income per unit sold—New & Recycled media Purchase
Brand Leader in the "used/recycled" marketplace
Increased user marketing data/opportunities
Added Features not seen with ANY other digital media site
Reduces illegal media downloading
Partnership provides total scalability instantly
Latest generation database technology ReDigi™ Solution
Dynamic Digital Rights Tracking (DDRT) Technology
Dynamic Inventory Management (DIM)
Supplemental Profit Allocation—and instant view back office
Total Media life cycle control and information tracking
  Typical length of ownership, genre, quantity, etc.
  Automated Music preferences algorithm provides suggested items to member ReDigi™ Features:
  Trade-in, Earn & Purchase Digital Media
  Swap-Me™ Trade-in media that has been legally purchased/downloaded with an attached DRM or L Code
    Algorithm provides instant credit allocation to member based on Billboard top 100, Amazon top 50 Video Games, NY times bestsellers.
    Identifier scans all Swap-Me™ files for ReDigi™ tags, (Media previously purchased new from ReDigi™ gets additional Swap-Me™ credit).
  Digi Bucks™ Home Page Designed with Digi Bucks Search Bar—SEARCH to earn credits toward purchases.
  ReDigi™ refer friends and when they sign up and make first purchase, win credits.
  Its-Hot see what your ReDigi™ friends are buying when looking for media, purchase (preferences allow member to block friends view).
  Gotta-Have-It™ tag(s) recycled media that you want but currently not in inventory, member is notified via email/Text as soon as ReDigi™ has inventory.
    If member connects to the link and inventory has been sold a Gotta Have It™ discount is provided on a new copy, as long as, member purchases within 20 minutes of logging in. Available for 2 hours after text/email delivery.
  Turn-Me-On™ sends your friends a quick clip of media you love, (includes an easy purchase link)
  Guess-What-I-Got™ Single touch notifier tells "friends" what you just purchased and provides an instant purchase link.

Additional Cool Features
Gift Media™ Allows members to select from listed charities and donate all or a portion of their proceeds to charity
MediaAllocator™ automatically allocates all sales to the appropriate parties including ReDigi™, Label, Artist, etc. (provides real time back office view)
ReDigi Bot™—cleans all donated digital media files using ReDigiPrint™ technology from all of the members synced and or connected devices, stringent privacy agreement.
Automated Owner Authenticity.
Media Direct™ provides Instant Links with major social network sites including Myspace, FaceBook, Twitter, Artist etc. for ease of purchasing awareness.
Data Collection/Marketing
  Members
  Members Network

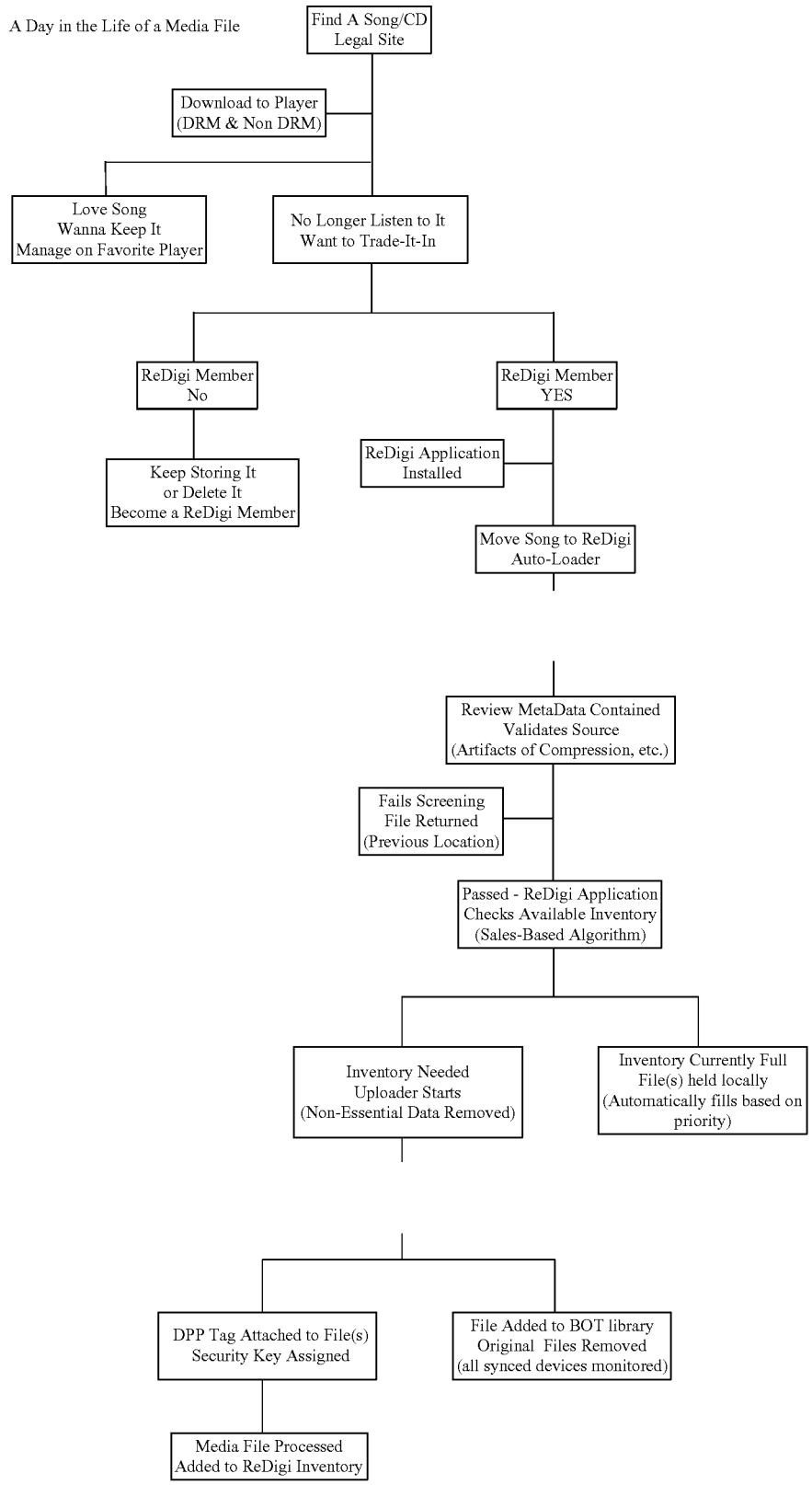

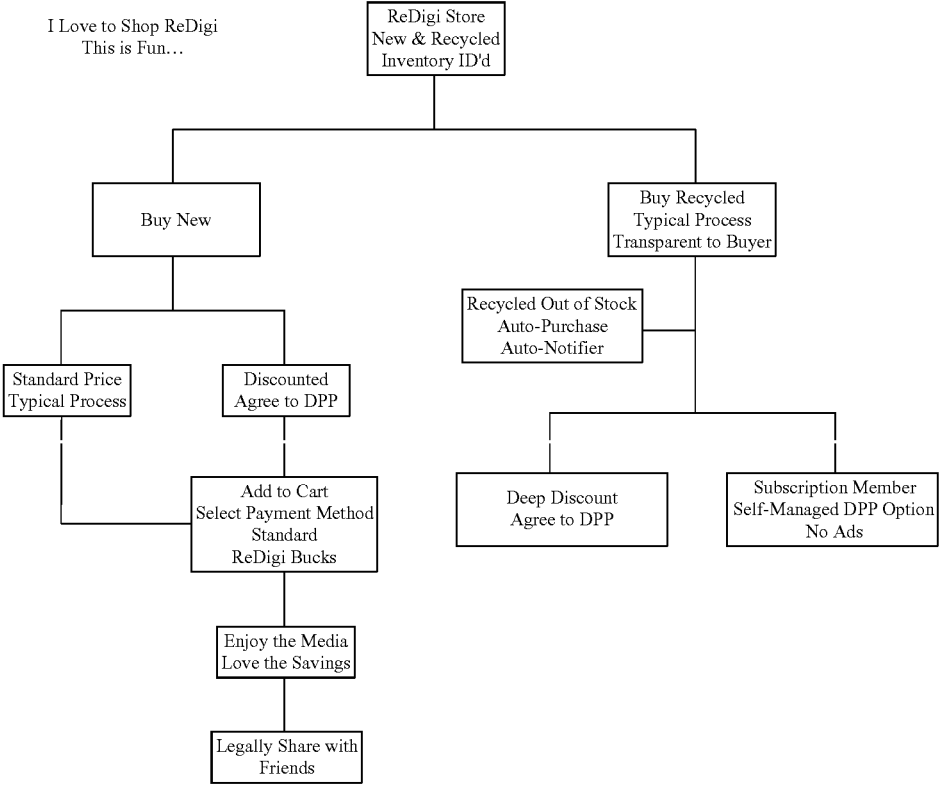

The invention claimed is:

1. A system for management of digital media objects, comprising:
   A. two or more digital data apparatus, including at least a first digital data apparatus and a second digital data apparatus, in communications coupling with one or more stores,
   B. a digital media object that is stored in one or more of the stores and that is accessible by at least one of the first digital data apparatus and the second digital data apparatus, where the digital media object contains any of a song, a book, a video, a movie, a story, a software application, and a game,
   C. management logic at least one of executing on and in communications coupling with at least one of the first digital data apparatus and the second digital data apparatus,
      the management logic assigns a common, unique fingerprint identifier to the digital media object and copies thereof,
      during a first period of time that corresponds to a time before a sale or gifting of the digital media object, the management logic (i) prevents the second digital data apparatus from accessing the digital media object or copy thereof having the common, unique fingerprint identifier, and (ii) allows the first digital data apparatus to access the digital media object or copy thereof having the common, unique fingerprint identifier,
      during a second period of time that is mutually exclusive of the first period of time and that corresponds to a time after the sale or gifting of the digital media object, the management logic (i) prevents the first digital data apparatus from accessing the digital media object or copy thereof having the common, unique fingerprint identifier, and (ii) allows the second digital data apparatus to access the digital media object or copy thereof having the common, unique fingerprint identifier,
      wherein, during at least one of the first and second periods of time, the management logic prevents such access by blocking access to the digital media object or copy thereof by a filesystem of a said digital data apparatus, and
   D. a server digital data apparatus that includes a central store, and
      the management logic effects the sale or gifting by making an atomic transfer of ownership, from a user of the first digital data apparatus to a user of the second digital data apparatus, of a particular copy of the digital media object in the central store.

2. The system of claim 1, wherein the server digital data apparatus (i) is in communications coupling with the first and second digital data apparatus, and (ii) executes the management logic at least in part.

3. The system of claim 1, wherein the first digital data apparatus generates a request to sell or to gift the digital media object.

4. The system of claim 3, wherein the management logic responds to a said request to sell or to gift the digital media object by confirming that a said user of the first digital data apparatus owns that object.

5. The system of claim 1, wherein the second digital data apparatus generates a request to buy or to be gifted the digital media object.

6. The system of claim 5, wherein the management logic includes a subsystem that responds to the request to buy or be to gifted the digital media object by generating a request to the first digital data apparatus and/or a said user thereof to confirm that it wishes to sell or to gift the digital media object.

7. A system for management of digital media objects, comprising:
   A. a first set of one or more digital data apparatus and a second set of one or more digital data apparatus, the first and second sets of digital data apparatus in communications coupling with one or more stores,
   B. a digital media object that is stored in one or more of the stores and that is accessible by at least one of the first set of digital data apparatus and the second set of digital data apparatus, where the digital media object contains any of a song, a book, a video, a movie, a story, a software application, and a game,
   C. management logic at least one of executing on and in communications coupling with at least one of the first set of digital data apparatus and the second set of digital data apparatus,
      the management logic assigns a common, unique fingerprint identifier to the digital media object and copies thereof,
      during a first period of time that corresponds to a time before a sale or gifting of the digital media object, the management logic (i) prevents the second set of digital data apparatus from accessing the digital media object or copy thereof having the common, unique fingerprint identifier, and (ii) allows the first set of digital data apparatus to access the digital media object or copy thereof having the common, unique fingerprint identifier,
      during a second period of time that is mutually exclusive of the first period of time and that corresponds to a time after the sale or gifting of the digital media object, the management logic (i) prevents the first set of digital data apparatus from accessing the digital media object or copy thereof having the common, unique fingerprint identifier, and (ii) allows the second set of digital data apparatus to access the digital media object or copy thereof having the common, unique fingerprint identifier,
      wherein, during at least one of the first and second periods of time, the management logic prevents such access by blocking access to the digital media object or copy thereof by a filesystem of a said set of digital data apparatus, and
   D. a server digital data apparatus that includes a central store, and
      the management logic effects the sale or gifting by making an atomic transfer of ownership, from a user of the first set of digital data apparatus to a user of the second set of digital data apparatus, of a particular copy of the digital media object in the central store.

8. The system of claim 6, wherein the server digital data apparatus (i) is in communications coupling with the first and second sets of digital data apparatus, and (ii) executes the management logic at least in part.

9. The system of claim 7, wherein a said digital data apparatus of the first set of digital data apparatus generates a request to sell or to gift the digital media object.

10. The system of claim 9, wherein the management logic responds to a said request to sell or to gift the digital media object by confirming that a said user of a said digital data apparatus of the first set of digital data apparatus owns that object.

11. The system of claim 7, wherein a said digital data apparatus of the second set of digital data apparatus generates a request to buy or to be gifted the digital media object.

12. The system of claim 11, wherein the management logic includes a subsystem that responds to the request to buy or be to gifted the digital media object by generating a request to a said digital data apparatus of the first set of digital data apparatus and/or a said user thereof to confirm that it wishes to sell or to gift the digital media object.

13. A method for management of digital media objects, comprising:
   A. storing at least one of a digital media object and a copy thereof in one or more stores accessible by two or more digital data apparatus, including at least a first digital data apparatus and a second digital data apparatus, where the digital media object contains any of a song, a book, a video, a movie, a story, a software application, and a game,
   B. with management logic at least one of executing on and in communications coupling with at least one of the first digital data apparatus and the second digital data apparatus, assigning a common, unique fingerprint identifier to the digital media object and copies thereof,
   C. with the management logic, (i) preventing the second digital data apparatus from accessing the digital media object or copy thereof having the common, unique fingerprint identifier during a first period of time that corresponds to a time before a sale or gifting of the digital media object, and (ii) allowing the first digital data apparatus to access the digital media object or copy thereof having the common, unique fingerprint identifier during that first period of time,
   C. with the management logic, (i) preventing the first digital data apparatus from accessing the digital media object or copy thereof having the common, unique fingerprint identifier during a second period of time that is mutually exclusive of the first period of time and that corresponds to a time after the sale or gifting of the digital media object, and (ii) allowing the second digital data apparatus to access the digital media object or copy thereof having the common, unique fingerprint identifier during that second period of time,
   D. preventing, during at least one of the first and second periods of time, such access by blocking access to the digital media object or copy thereof by a filesystem of a said digital data apparatus, and
   E. effecting the sale or gifting by making an atomic transfer of ownership, from a user of the first digital data apparatus to a user of the second digital data apparatus, of a particular copy of the digital media object in the central store of a server digital data apparatus.

14. The method of claim 13, comprising executing the management logic at least in part on the server digital data apparatus, which is in communications coupling with the first and second digital data apparatus.

15. The method of claim 13, comprising generating, with the first digital data apparatus, a request to sell or to gift the digital media object.

16. The method of claim 13, comprising responding, with the management logic, to a said request to sell or to gift the digital media object by confirming that a said user of the first digital data apparatus owns that object.

17. The method of claim 13, comprising generating, with the second digital data apparatus, a request to buy or to be gifted the digital media object.

18. The method of claim 17, comprising responding, with the management logic, to the request to buy or be to gifted the digital media object by generating a request to the first digital data apparatus and/or a said user thereof to confirm that it wishes to sell or to gift the digital media object.

19. A method for management of digital media objects, comprising:
  A. storing at least one of a digital media object and a copy thereof in one or more stores accessible by a first set of one or more digital data apparatus and a second set of one or more digital data apparatus, where the digital media object contains any of a song, a book, a video, a movie, a story, a software application, and a game,
  B. with management logic at least one of executing on and in communications coupling with at least one of the first set of digital data apparatus and the second set of digital data apparatus, assigning a common, unique fingerprint identifier to the digital media object and copies thereof,
  C. with the management logic, (i) preventing the second set of digital data apparatus from accessing the digital media object or copy thereof having the common, unique fingerprint identifier during a first period of time that corresponds to a time before a sale or gifting of the digital media object, and (ii) allowing the first set of digital data apparatus to access the digital media object or copy thereof having the common, unique fingerprint identifier during that first period of time,
  C. with the management logic, (i) preventing the first set of digital data apparatus from accessing the digital media object or copy thereof having the common, unique fingerprint identifier during a second period of time that is mutually exclusive of the first period of time and that corresponds to a time after the sale or gifting of the digital media object, and (ii) allowing the second set of digital data apparatus to access the digital media object or copy thereof having the common, unique fingerprint identifier during that second period of time,
  D. preventing, during at least one of the first and second periods of time, such access by blocking access to the digital media object or copy thereof by a filesystem of a said set of digital data apparatus, and
  E. effecting the sale or gifting by making an atomic transfer of ownership, from a user of the first set of digital data apparatus to a user of the second set of digital data apparatus, of a particular copy of the digital media object in the central store of a server set of digital data apparatus.

20. The method of claim 19, comprising executing the management logic at least in part on the server set of digital data apparatus, which is in communications coupling with the first and second set of digital data apparatus.

21. The method of claim 19, comprising generating, with a said digital data apparatus of the first set of digital data apparatus, a request to sell or to gift the digital media object.

22. The method of claim 21, comprising responding, with the management logic, to a said request to sell or to gift the digital media object by confirming that a said user of a said digital data apparatus of the first set of digital data apparatus owns that object.

23. The method of claim 19, comprising generating, with a said digital data apparatus of the second set of digital data apparatus, a request to buy or to be gifted the digital media object.

24. The method of claim 23, comprising responding, with the management logic, to the request to buy or be to gifted the digital media object by generating a request to a said digital data apparatus of the first set of digital data apparatus and/or a said user thereof to confirm that it wishes to sell or to gift the digital media object.

* * * * *